INVENTOR
ALLEN M. FEDER

United States Patent Office 3,351,936
Patented Nov. 7, 1967

3,351,936
METHOD AND APPARATUS FOR EXPLORING THE EARTH WITH ELECTROMAGNETIC ENERGY
Allen M. Feder, Dallas, Tex., assignor to Texas Instruments Incorporated, Dallas, Tex., a corporation of Delaware
Filed Jan. 10, 1966, Ser. No. 519,605
9 Claims. (Cl. 343—5)

This invention relates to a method and apparatus for exploring geological and pedological conditions through the use of electromagnetic energy.

The method and apparatus of the invention utilize electromagnetic waves reflected from surface and subsurface geological features to provide information as to the location and shape of such features. The information is rapidly obtained; hence, when the apparatus of the invention is made airborne, it is particularly applicable to exploring a large area, locating gross geologic anomalies or extending information away from locations having known geologic conditions.

It is an object of the invention to provide a method and apparatus for utilizing electromagnetic radiation to explore surface and subsurface geological conditions.

Another object of the invention is to provide a method and apparatus using electromagnetic radiation for the airborne exploration of surface and subsurface geological features.

Yet another object of the invention is to provide a method and apparatus for utilizing electromagnetic radiation of a plurality of wave lengths to determine surface and subsurface geological and pedological characteristics.

A further object of the invention is to provide a method and apparatus for determining the location and shape of surface and subsurface features through the use of radar band energy.

In accordance with one aspect of the invention, an aircraft is equipped with apparatus for subjecting the underlying terrain area to radiation of two different radar wave lengths. Receiving apparatus measures, for each of the two wave lengths, where the radiation is substantially reflected from the area by subsurface geological features and where the radiation is completely absorbed by the area as, for example, by a thick, isotropic medium. The foregoing measurements indicate the existence of subsurface features in the area within two different depth ranges; hence, the record accumulated in accordance with the invention along the flight path of the aircraft provides information as to the location and shape of subsurface geological features.

Other objects, features, and advantages of the invention will be more readily understood from the following detailed description when read in conjunction with the appended claims and attached drawing in which:

The apparatus for providing information as to the location and shape of surface and subsurface geological formations in accordance with the invention will be described in connection with FIGURE 1. A description of the results produced by the apparatus in FIGURE 1 and the significance of the information provided thereby will be discussed in connection with FIGURE 2.

Figure 1:
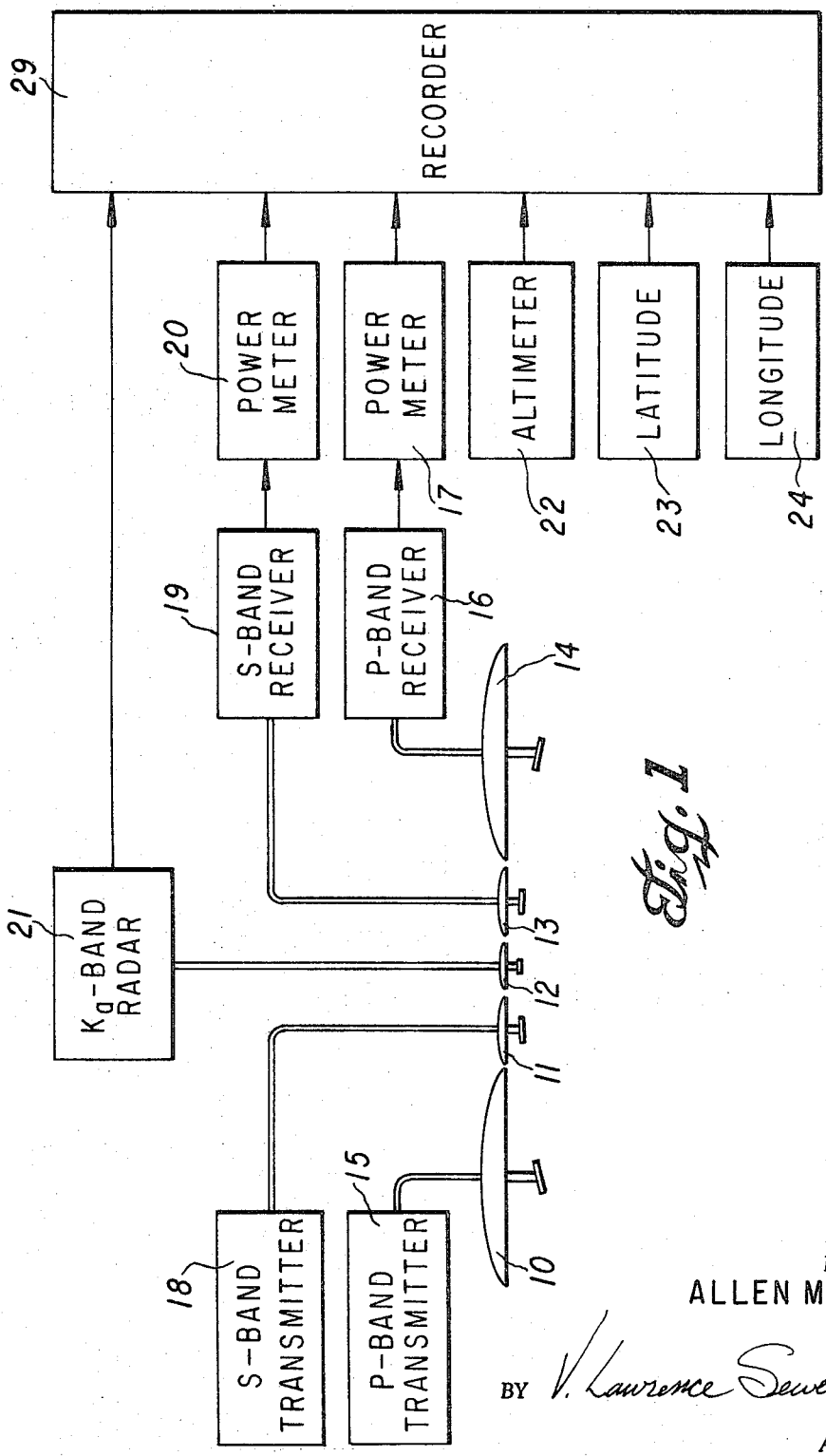
FIGURE 1 is a block diagram of an electronic system for exploring surface and subsurface geology in accordance with the invention.

The system shown in FIGURE 1 is mounted in an aircraft. Antennas 10, 11, 12, 13 and 14 are mounted side-by-side, for example, in a bi-static arrangement, to form a line perpendicular to the principal flight path axis of the aircraft. It will become apparent, however, that other arrangements are also suitable. Antenna 10 is a common parabolic antenna used in conjunction with P-band radar. Connected to antenna 10 is P-band transmitter 15 which causes antenna 10 to radiate P-band waves in a downward direction from the aircraft. Antenna 14, being for the purpose of receiving P-band waves transmitted by antenna 10 and reflected from the terrain, is matched to antenna 10, and is also of the parabolic type. Antenna 10 is arranged so that a major part of the radiant energy therefrom, reflected from the terrain below, will be directed toward antenna 14. Antenna 14 is correspondingly aimed to receive such energy. Transmitter 15 transmits a continuous wave signal; hence, P-band receiver 16 performs an amplification function, receiving the signal from antenna 14, amplifying it, and transmitting the signal to power meter 17. Power meter 17 is of the common type for measuring P-band power, in this case, at the output of receiver 16. Power meter 17 produces an analog signal output scaled to indicate the power detected at the input thereof. The analog output of power meter 17 is recorded on one channel of recorder 29, which may be for example, a seven-channel strip chart recorder.

Several alternatives to the P-band system described are possible. For example, instead of P-band receiver 16, there may be provided a local oscillator which is heterodyned with the signal from antenna 14, the lower sideband energy being amplified, and power meter 17 being made responsive to the lower sideband energy rather than P-band energy. To conserve the amount of radiated power required of the system in FIGURE 1, to achieve greater peak power, and to overcome possible sources of error such as Doppler effect, transmitter 15 may be made to produce a burst of radar frequency waves rather than a continuous wave output. In such a system, receiver 16 is replaced by a circuit which is responsive to the first large reflected wave burst corresponding to each transmitted wave burst. A meter in the place of power meter 17 then produces an analog output representative of the power of the received wave burst.

The function of S-band transmitter 18, transmitting antenna 1, receiving antenna 13, S-band receiver 19 and power meter 20 are the same as the corresponding P-band components, the difference in construction of components being due only to the requirement for operation in the S-band. The output of power meter 20 is recorded on a channel separate from that on which the output of power meter 17 is recorded. The alternative structures described in connection with the P-band system are of course, also possible in the case of the S-band system.

Antenna 12 is both a transmitting and receiving antenna for $K_a$-band radar 21. The $K_a$-band radar system unlike the reflected power measuring S-band and P-band systems, is actually a range measuring system. Antenna 12 is directed to transmit waves to the terrain below and receive reflections from the surface thereof. The $K_a$-band radar 21, in the normal fashion, transmits a burst of radar energy, from antenna 12, receives reflected bursts at the same antenna, and detects the elapsed time between the transmitted and received bursts. Radar 21 produces an analog signal output of this elapsed time, scaled to indicate the distance from antenna 12 to the terrain surface. The analog signal after being filtered to produce a continuous function, is recorded on still another channel of recorder 29.

Barometric altimeter 22 produces an analog output scaled to indicate the elevation of the aircraft above some reference point, as for example, mean sea level. The analog output is recorded on a separate channel of recorder 29. Latitude system 23 and longitude system 24 are the two portions of a conventional Doppler navigation system which forms a portion of the apparatus of FIGURE 1. The two outputs of the navigation system are displays of the changes in latitude and in longitude of the aircraft from a reference location. The displays serve to record the location at which the geological exploration is performed. The corresponding channels of recorder 29 are equipped with printers to record thereon the digital output of the latitude and longitude systems, as illustrated in the lower portion of the chart in FIGURE 2.

Figure 2:
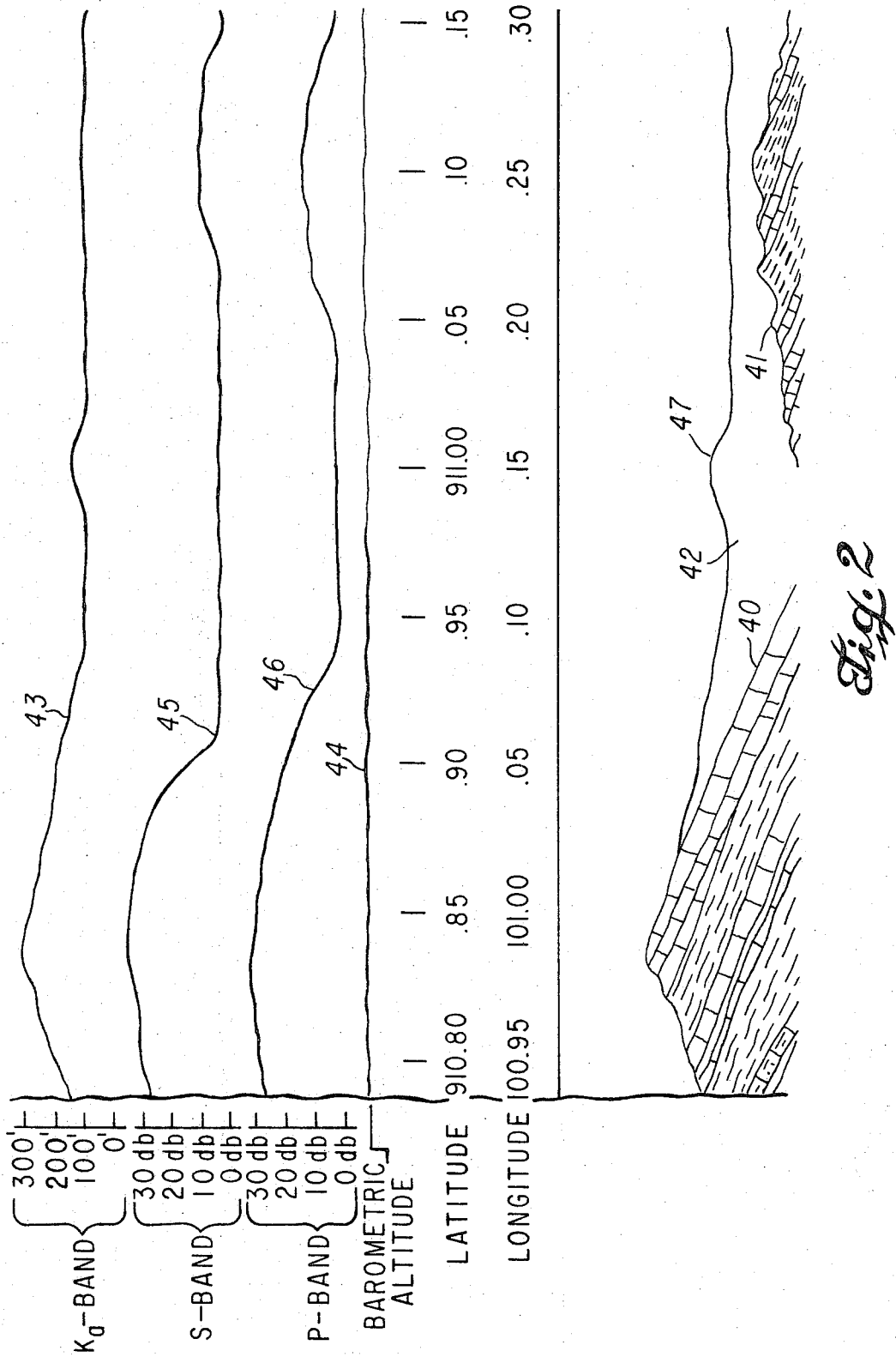
FIGURE 2 shows a chart record of data collected in exploration according to the invention and also a cross-section of the terrain to which the data corresponds.

In FIGURE 2 there is seen a terrain cross-section. Features of particular interest in the use of the invention are the formations of bedrock 40 and 41 rising beneath the weathered layer and unconsolidated material 42. Shown above the cross-section is a section of the chart record which would be produced by chart recorder 29 as the system of FIGURE 1 is flown above the terrain shown in FIGURE 2. The chart record and cross-section are drawn to such scales that the information recorded at a given distance along the chart represents the information recorded at the terrain location directly below that chart location in FIGURE 2.

The traces recorded on the chart indicate the presence of the geological structure seen in the cross-section in the following manner and to the following extent. The distance trace 43 produced by the $K_a$-band radar 21 indicates the surface profile and topography of the location. Because of the short wave length of the $K_a$-band wave, a large portion of the $K_a$-band energy is reflected from the surface of the ground. As explained above, the $K_a$-band radar system in the system of FIGURE 1 produces as its output a signal indicating the distance of this reflecting ground surface from the aircraft. To be examined in conjunction with the $K_a$-band trace 43 is the barometric altitude trace produced by altimeter 22. The barometric altitude trace 44 displays the altitude of the exploration aircraft above mean sea level, and hence establishes the reference location from which the $K_a$-band measurements are made. Knowledge of the aircraft altitude may be used to correct apparent changes in surface topography appearing in the $K_a$-band trace, which changes actually result from changes in aircraft altitude. Such correction may be made electronically by providing a trace which represents the difference of trace 43 and trace 44. For the particular traces shown in FIGURE 2, it is seen that altitude trace 44 shows almost no variation, and trace 43 accordingly has approximately the shape of the terrain cross-section surface.

The power of the reflected S-band radiation is shown by trace 45. A much smaller amount of the S-band radiation is reflected from the surface of the weathered layer and unconsolidated material 42 than in the case of the $K_a$-band energy, because of the S-band's longer wave length. However, the S-band energy is substantially reflected from the surface of the bedrock, both when the bedrock is exposed and when it is beneath the unconsolidated material 42. The large amount of S-band power reflected from the exposed bedrock is seen on the chart at that portion corresponding to latitudes 910.80 through 910.87. As the bedrock begins to lie beneath the radio energy absorbing unconsolidated material 42 at approximately 910.87, the amount of reflected S-band power shown in trace 45 begins to decrease, because some of the S-band energy transmitted from the aircraft is being absorbed by the unconsolidated layer 42 in transit to and from the reflecting surface of the bedrock 40. The decrease of reflected power corresponding to the increasing depth of the reflecting surface continues to approximately latitude 910.91, at which point the chart reading indicates that the S-band energy is being totally absorbed by the unconsolidated material 42. If the unconsolidated material is of such a composition, temperature and moisture content that the S-band energy is known to be totally absorbed at a depth of five meters, it can be seen that the bedrock has decreased to a distance of five meters beneath the unconsolidated material at this location. The S-band power remains substantially unchanged until approximately latitude 911.07, at which point the system of the invention begins to receive reflected S-band energy from the surface of bedrock 41 rising beneath the unconsolidated material 42. In particular, surface anomaly 47 is not indicated on the S-band trace, since the S-band energy is hardly reflected from the surface of the weathered layer and unconsolidated material. As the bedrock 41 rises somewhat into the penetration range of the S-band waves, the power recorded on the chart slightly increases, levels off, and finally decreases at a latitude of about 911.13, as the bedrock goes further beneath the unconsolidated material.

The reflected power of the P-band radiation is shown by trace 46. The P-band waves, like the S-band waves, are reflected by the bedrock 40, but very little from the surface of the unconsolidated material 42. The most notable difference between the reflected P-band energy and that of the S-band is that the longer wave length P-band energy tends to be absorbed to a lesser degree by the unconsolidated material 42. Hence, the P-band waves may be reflected from the surface of the bedrock at deeper levels beneath the unconsolidated material than would the S-band waves. For the example shown in FIGURE 2, it is seen that P-band reflections are received even to a latitude of 910.94, at which point the P-band energy begins to be completely absorbed. If a knowledge of the particular unconsolidated material 42 encountered indicates total absorption of the P-band energy at a depth of fifteen meters, the reflecting bedrock surface may be said to be fifteen meters beneath the ground at this location. When the reflecting surface of bedrock 41 begins to rise into the range of the P-band waves at about 911.04, the reflected P-band power increases. The level of the P-band power reflected from bedrock 41 is never so great as the maximum power reflected from bedrock 40, since bedrock 41 does not totally penetrate the unconsolidated material. The disparity in the measured power reflected from bedrock 40 and from bedrock 41 illustrates the type of depth information provided by the amount of power received from different levels above the total absorption depth. That is, the amount of power recde ipevfl,o depth. That is, the amount of power received and provides an estimate of the depth of the reflecting formation between the surface and the depth corresponding to total absorption. Information as to the dielectric constant of the unconsolidated material 42, which may be obtained by radar analysis can improve the accuracy of the depth estimate.

The geological exploration according to the invention thus provides information as to the presence and depth of reflecting subsurface interfaces. The reception of reflected P-band power from a terrain area indicates the presence of a reflecting interface within the depth range of the P-band radiation, and the amount of power received provides an estimate of the depth of the interface within that range. Moreover, the absorption of the radiation measures when an interface reaches the P-band absorption depth. The S-band system similarly indicates the presence and depth of reflecting interfaces within a shallower range of depths than the P-band system and indicates where an interface approaches the S-band absorption depth. One advantage in the use of the two systems together appears in the absorption depth information produced by the combined systems, for such information includes more than just the detection of formations at two independent subsurface levels. For a single formation detected at both levels, the combined readings provide an indication of the slope of the interface and hence a basis for extrapolating the shape of the formation between the levels and at depths greater than those measured. The sloping surface of bedrock 40 illustrates this utility. For instance, considering FIGURE 2, it may be determined from trace 45 that at approximately latitude 910.91 the bedrock 40 is about five meters beneath the unconsolidated material at this location. Further, it may be seen from trace 46 that the bedrock 40 is about fifteen meters beneath the unconsolidated material at approximately latitude 910.94. The bedrock 40 thus slopes downwardly about ten meters from latitude 910.91 to latitude 910.94. Depth information recorded by means of mutiple, systematic exploration flights over a large area may be displayed in the form of a hypsometric contour map. The information produced by the invention for such a map indicates not only the location and shape of subsurface phenomena in the latitude and longitude dimensions, but also indicates location and shape in the depth dimension.

The record of surface topography provided by the $K_a$-band radar of the inventon has its primary utility in establishing the surface reference from which depth measurements are made to underlying formations. In addition, the surface topography record provides the capability of determining whether a change in P-band or S-band reflected power results from an inordinate change in the height of the aircraft above ground.

For the information recorded in accordance with the invention to be most meaningful, there must be an accompanying knowledge of the character of the layers through which the radiations must penetrate before reflection, the effect of such a layer on the radiation, and the types of interfaces which can give rise to substantial reflections. For example, an overlying water layer significantly affects absorption and hence changes the depths at which the subsurface exploration is performed. Therefore, it is seen that the method and apparatus are particularly useful in extending information away from locations having a known geological condition, such as outcrops or drill holes. In such situations, the type of formations encountered at the reference point can be correlated with the signals recorded there by the apparatus of the invention. The invention is likewise well suited for locating gross geologic anomalies for later identification, as for example, aquiferous regions beneath uniform, low relief overburden. In such applications, the data provided by the invention may be gathered very quickly, enabling large areas to be explored.

Several modifications of the method and apparatus as described are possible. For example, more radiating systems of other wavelengths may be added to those described above to increase the resolution and extrapolation provided by the invention. A simpler system, though providing less information, would be one making use of, say, only the P-band radiation. If it is desired to explore a different range of depths than those described herein, radar bands other than the P-band and S-band may be employed. The main factor determining the wavelengths to be used, is the amount of penetration into the encountered weathered layer and unconsolidated material which is provided by the wavelength in question. To observe a shallower depth region than that corresponding to the S-band, shorter wavelengths may be used, until the wavelengths are so short that, like the $K_a$-band, the radiation is largely reflected from the surface of the terrain area. For deeper penetration than provided by the P-band energy, radiation having a wavelength longer than the P-band wavelengths may be employed. Wavelengths approximately in the band of radar wavelengths offer the advantages of compact antenna equipment and better resolution than provided by much longer wavelengths. Such wavelengths may also readily be focused to restrict the size of the area under observation and to minimize wasted power. For reasons including some of the foregoing, the equipment necessary to operate at much longer wavelengths is generally bulkier and difficult to make airborne or otherwise portable.

A hypsometric contour map of the results produced by the invention may be obtained automatically by moving the airborne system in a regular pattern and arranging an electronic signal level detector to detect the times at which the reflected electromagnetic radiation becomes totally absorbed by the unconsolidated material, thereby providing a pulse which may be supplied to an X-Y plotter to produce contours corresponding to the absorption depths. Similarly, a variable density plotter may be employed to print on a map a variable density plot of the amount of electromagnetic energy of each wavelength received, thereby including with the absorption depth contours, the information provided by the amount of such energy received.

In accordance with another modification of the invention, the terrain surface penetrating energy, such as the P-band energy, is used as radar to measure the depth of subsurface reflecting features. As described in connection with FIGURE 1, transmitter 15 is made to generate a burst of radar waves and the receiver is responsive to the first large reflection received in order to respond to the subsurface reflection, but not the small, surface reflection. Such a receiver arrangement may be accomplished by signal amplitude discrimination and the use of bistable circuitry to render the receiver insensitive to further reflected bursts after the first is received and until another burst is transmitted. Ordinary radar apparatus would measure the transit time, the time elapsed between the transmitted and received bursts, to establish the depth of the first significantly reflecting surface. The output of the $K_a$-band system may provide a constant time delay to be substracted, accounting for the transit time of the radar waves through the air.

Another method of obtaining depth information in accordance with the invention is the detection of interference patterns in the waves reflected from a terrain area. Sometimes the electromagnetic energy will reflect from both the top and bottom of a layer, though different amounts are reflected from one than the other.

If thicknesses of the layer, closely corresponding to certain multiples of the radiated wavelength, the constructive or destructive interference of the two reflected waves produces an extraordinarily low or high received signal amplitude. The detection of such interference conditions, when taken with other depth indications can provide information as to the thickness of the layer in wavelengths.

Thus, it is to be understood that the above-described embodiment is merely illustrative of the application of the principles of the invention. Numerous other arrangements may be devised by those skilled in the art without departing from the spirit and scope of the invention as defined by the appended claims.

What is claimed is:

1. An apparatus for geological and pedological exploration comprising:
    transmitting means supported for movement along a vehicle traverse for subjecting the terrain to first and second radiations having different wavelengths approximately within the range of the radar wavelengths, said first radiation having a first soil absorption factor for penetration of said terrain to a first predetermined depth, said second radiation having a second different soil absorption factor for penetration of said terrain to a second predetermined depth,
    means for receiving energy of said first and second radiations reflected from said terrain to produce first and second return signals respectively representative of power in the received energy, and
    recording means responsive to said receiving means to separately record said first and second signals as a function of location along said traverse to provide an indication of the shape and location of subsurface and surface geological features within said first and second terrain depths.

2. The apparatus of claim 1 wherein said transmitting means includes a generator for said first radiation in the range of P-band radar wavelengths and a generator for said second radiation in the range of S-band radar wavelengths.

3. The apparatus of claim 2 and further comprising:
   range determining means for providing a signal indication of the general profile of the surface geological features of said terrain,
   altimeter means for providing a signal indication representative of the altitude of said vehicle traverse with respect to a reference altitude, and
   means for recording said signal indications to provide an accurate record of the terrain profile.

4. The apparatus of claim 2 and further comprising:
   a navigation system for providing outputs representative of the latitude and longitude of said vehicle traverse along said terrain, and
   means to record said spatial outputs adjacent the records of said first and second signals to enable the accurate determination of geological features of the terrain.

5. The method of geological and pedological exploration comprising the following steps:
   subjecting the terrain along a vehicle traverse to a first radiation having a wavelength approximately within the range of the radar wavelengths and having a first soil absorption factor to enable penetration of said terrain to a first predetermined depth,
   subjecting said terrain to a second radiation having a wavelength different from that of said first radiation approximately within the range of the radar wavelengths and having a second soil absorption factor differing from said first soil absorption factor to allow penetration of said terrain to a second predetermined depth,
   receiving energy of said first and second radiations reflected from said terrain to provide first and second return signals respectively representative of power in the received energy, and
   separately recording said first and second signals in correlation with location along said traverse to provide an indication of the shape and location of subsurface and surface geological features within said first and second terrain depths.

6. The method of claim 5, wherein the wavelength of said second radiation is approximately in the range of P-band radar wavelengths.

7. The method of claim 5 wherein the wavelength of said first radiation is in the range of P-band radar wavelengths and said second radiation is in the range of S-band radar wavelengths.

8. The method of claim 7 and further comprising:
   subjecting said terrain to a third radiation having a wavelength approximately within the range of the radar wavelengths and shorter than the wavelengths of said first and second radiations,
   receiving energy of said third radiation reflected from said terrain to produce a third return signal,
   separately recording said third signal with said first and second signals to provide a general indication of the profile of the surface geological features of said terrain,
   generating a fourth signal representative of the altitude of the vehicle traverse with respect to a reference altitude, and
   separately recording said fourth signal adjacent the recording of said third signal,
   for correction of said third recorded signal for variations to said reference altitude to provide an accurate record of the terrain profile.

9. The method of claim 7 and further comprising:
   generating a traverse signal indicating the spatial location of the vehicle along said traverse, and
   recording said traverse signal adjacent the recorded first and second signals to facilitate a determination of the slope of selected subsurface geological features.

References Cited

UNITED STATES PATENTS

| | | |
|---|---|---|
| 2,045,071 | 6/1936 | Espenschied. |
| 2,610,226 | 9/1952 | Klaasse et al. |
| 3,098,225 | 7/1963 | Anderson. |

RODNEY D. BENNETT, *Primary Examiner.*

D. C. KAUFMAN, *Assistant Examiner.*